UNITED STATES PATENT OFFICE.

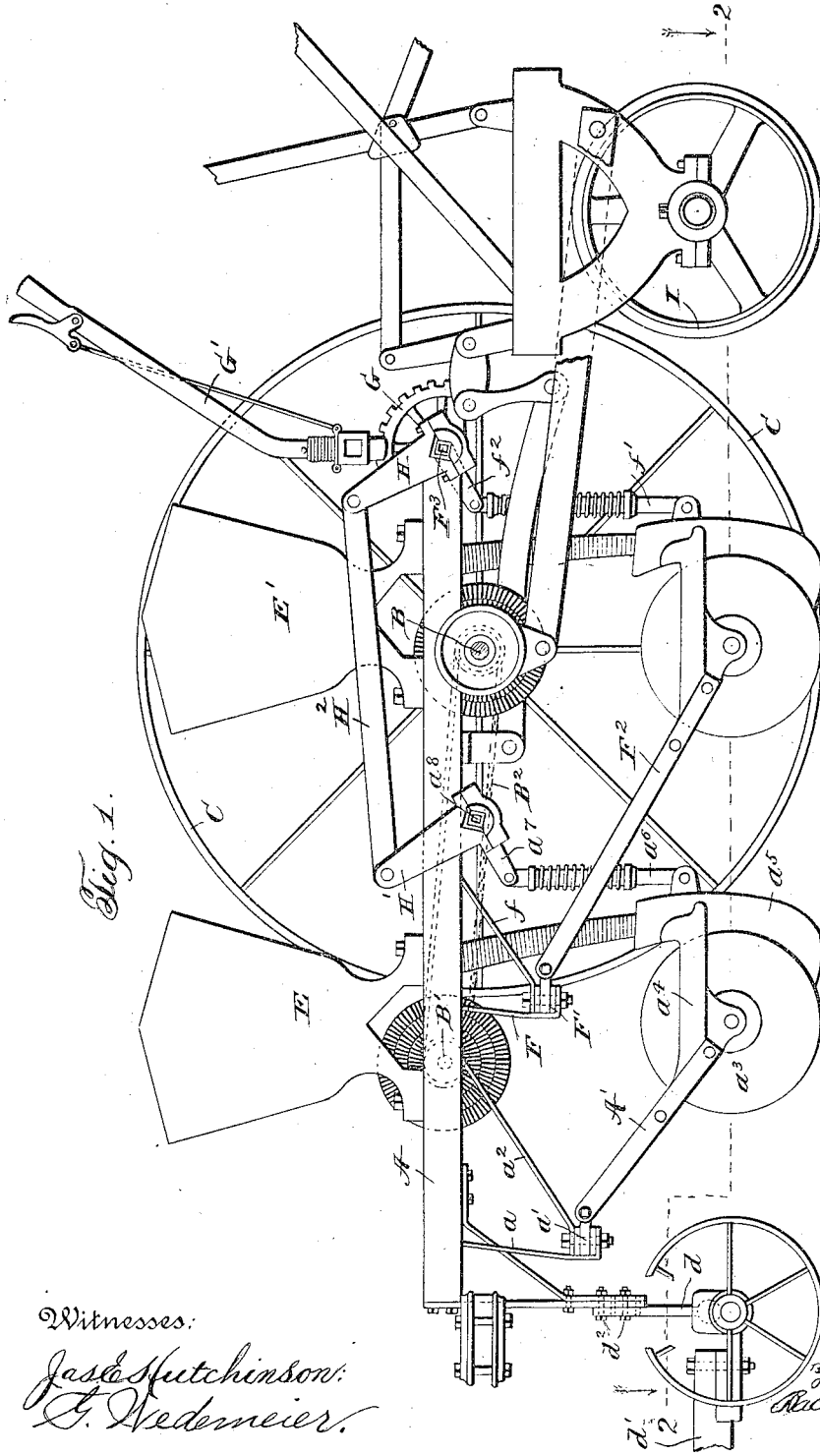

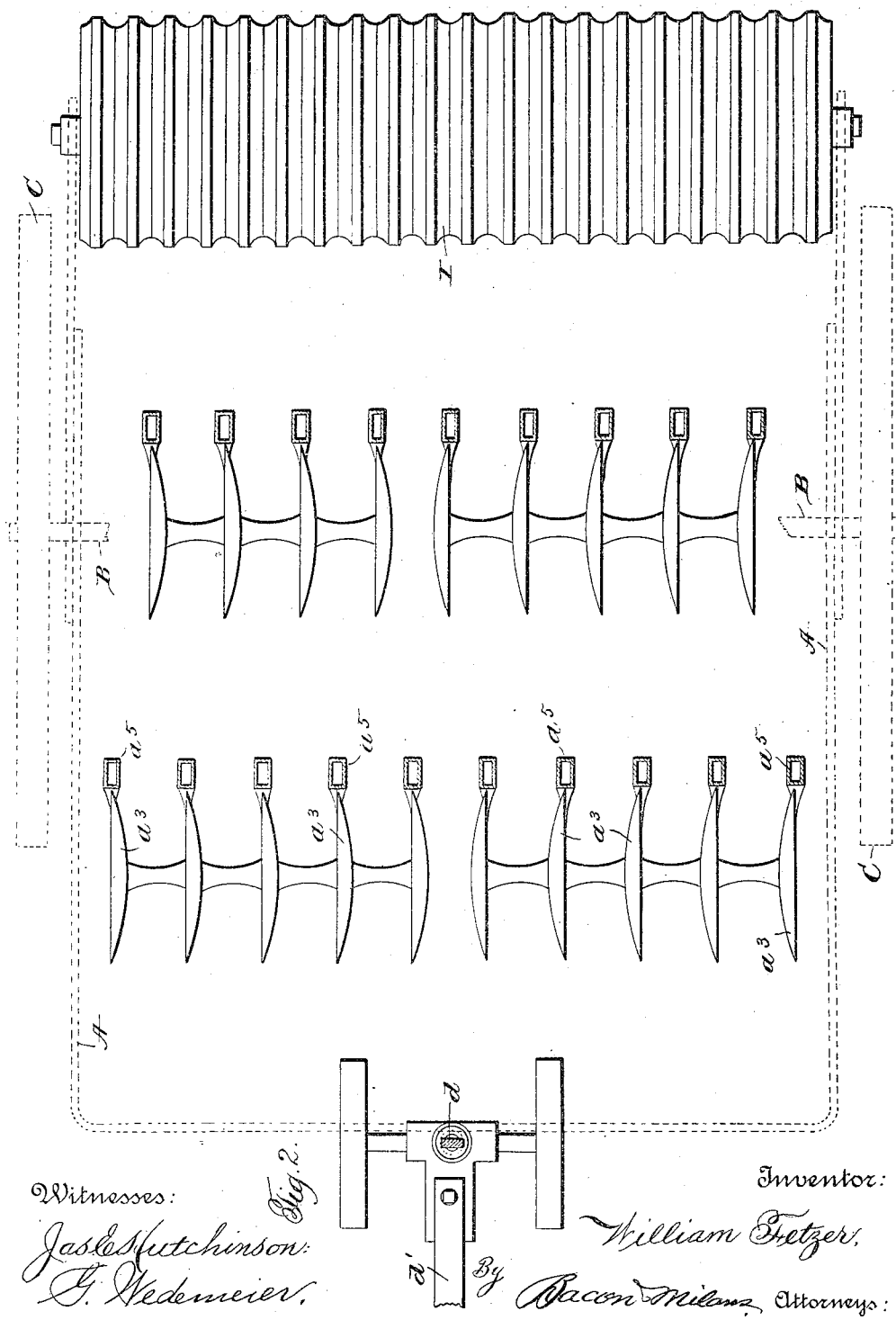

WILLIAM FETZER, OF SPRINGFIELD, ILLINOIS.

SEED-DRILL.

1,281,325.

Specification of Letters Patent.   Patented Oct. 15, 1918.

Application filed August 5, 1913.   Serial No. 783,174.

*To all whom it may concern:*

Be it known that I, WILLIAM FETZER, a citizen of the United States, residing at Springfield, in the county of Sangamon and State of Illinois, have invented certain new and useful Improvements in Seed-Drills, of which the following is a specification, reference being had therein to the accompanying drawing.

This invention relates to an improvement in drills designed more particularly for use as an alfalfa drill. At the present time, the more general practice of sowing alfalfa seed is that of broadcasting, the usual grain drills not being adapted for the purpose. In the disk drill art it has heretofore been the custom and accepted practice to arrange the respective shoes and disks approximately six inches apart, while with what is known as the "hoe" drill, it is necessary to place the same approximately seven inches apart. In view of this wide separation of the runners and rows of the usual drill, they have been found impracticable for use in connection with sowing alfalfa or hayseeds, inasmuch as practically one half of the ground would not be occupied by the planted seeds. Allowing the bare earth to be unoccupied by the seeds between widely spaced rows, much evaporation is permitted during the dry seasons or hot winds, which materially affects the infant roots of the sprouting seeds. Again, with a wide separation of rows, the alfalfa or hay seed if planted by the usual drill, room is left for the propagation of weeds, which obviously is highly objectionable. In "broadcasting," seeds are thrown indiscriminately and are overcrowded and thereby materially affecting the entire crop, while in drilling the rows are separated allowing ample room for proper and regular growth of the seeds.

My invention relates to a drill having the planting instrumentalities so arranged that the rows of seed may be deposited in the ground closely, approximating from two and one-half to three inches apart and permitting the employment in that particular of what is known as the disk drill which is desirable in what is now known as the alfalfa region. In disk drills the disks of the shoes, together with their draw bars represent a very material width, a substantially wide space between the disks for satisfactory operation being required, six inches being the usual spacing, as stated. This being the condition, I have produced a drill wherein the required space between the disks may be utilized by like disks positioned in staggered relation or between and in rear of the same.

The invention therefore consists generally in a drill having means whereby two rows of disks may be employed in close relation and mechanism for feeding the seeds properly to the respective shoes. The invention comprehends also the employment of separate feed hoppers and means for simultaneously adjusting the disks or shoes into and out of the soil, as occasion may require and in addition thereto special devices and combinations presently to be described.

While the invention is designed more particularly for an alfalfa drill, it will be understood that it may be used for other purposes when desired.

In the accompanying drawings I have shown an embodiment of the improvement, but desire it understood that various details and special arrangements can be altered and modified without departing from the nature and principle of the invention.

In the drawings:

Figure 1 is a longitudinal side elevation; and

Fig. 2 is a plan partly in section parts being omitted, and indicating the relative position of the forward and rear drill section.

The frame of the machine is formed conveniently with side bars A mounted on the driving axle B, which in turn is carried by the wheel C in the usual manner. Projecting from the center of the forward part of the frame is a bracket member D, depending therefrom and carrying at its lower end a tongue truck $d'$. This tongue truck is of a character conveniently shown in my U. S. Letters Patents numbered respectively Reissue 12653 dated May 21, 1907, and Patent 843,672, dated Feb. 12, 1907, but differs therefrom in the particulars that the connection between the depending bracket D and the truck proper is formed in two parts, the lower part $d$ being adjustable vertically by suitable bolts $d^2$ on the lower portion of the bracket. By this means the forward end of the frame of the machine may be lowered or raised to suit the varying conditions. E and E' represent the forward and rear hoppers of any approved type and have any desired or approved form of seed cups therein. These hoppers may as in many of the usual drills, be divided centrally, the rear portions comprising the fertilizer compartments. The feed cups of the various hoppers are operated in any well known manner, conveniently those of the rear hopper being operated by the driving axle B supported by the carrying wheels, and the forward cups by a similar mechanism comprising countershaft or axle B', the two axles being connected by a suitable drive chain B². The motion of the drive wheels will be transmitted to both axles. Inasmuch as the feed cup operating mechanism and the hoppers specifically form no part of the present invention it is thought unnecessary to further explain the details of construction thereof.

Extending downwardly from the forward part of the frame A are a series of vertical bars $a$, carrying on their lower ends coupling bars $a'$. These vertical bars are strengthened by diagonal members $a^2$, extending up to and connected to the frame, the vertical bars $a$ extending downward to a point substantially in line with the tongue truck wheels and having coupled thereto a series of drag bars A' in which are journaled the disks $a^3$ of the forward line of disks. By suitable castings $a^4$, connected with the drag bars A', the drill shoes $a^5$ are properly positioned and held. The specific construction of the drill disk and shoes, together with the lifting and pressing bars $a^6$ thereof are of the usual and well known type, the bars $a^6$ extending upward and having the usual pressing down springs K thereon, the upper end being connected to lifting or depressing arms $a^7$ mounted on a cross shaft $a^8$ journaled in the frame. The usual conducting tubes K lead from the hoppers into the shoes in the usual or approved manner. The drag bars comprise conveniently two bar members having their forward ends spread apart so that the disk will be properly held against tilting and are pivotally connected in the usual manner to the bar $a'$. These drag bars are as closely associated as they can conveniently be, but owing to the necessity of providing ample space between the disks and the non-tilting connection for the forward ends of the drag bars, there is a considerable space, approximately six inches between the shoes of the respective disks, as is usual.

Depending from the frame in the rear of the vertical bars $a$ is a similar series of vertical bars F carrying on the lower ends the coupling bar F' and each is braced by diagonal braces $f$. The length of the bars F is less than the length of the bars $a$, the same terminating downwardly at a point above the plane of the coupling or drag bars of the forward disks.

Coupled to the rear coupling bar are a series of relatively long drag bars F² which carry on their rear ends disks and shoes similar to those of the forward row. The lifting and depressing bar $f'$ of the rear disks extend up and are coupled to the arms $f^2$ on a counter-shaft F³ mounted in the rear end of the frame. The position of the drag bars F² and their disks with relation to the position of the forward disks is intermediate or between the plane of the forward disks, so that they present a staggered relation therewith. The disks of the rear set operate by virtue of this staggered arrangement in the space between the rows planted by the forward disks. By this arrangement it will be readily seen that the planting is contracted so that the space between the rows will represent practically one-half of the space between the rows planted by the respective sets of disks.

To elevate and depress the rows of disks I conveniently form or secure on the rear ends of the frame A racks G, and keyed to the shaft F³, hand levers G' of any approved construction. These levers are provided with latches so that as the levers are drawn backward or forced forward the shaft F³ will be rotated and held in position. On the outer ends of the shaft F³ there are secured fixed lever arms H extending conveniently upward, while on the outer ends of the shaft $a^8$ are secured similar arms H'. These two arms H and H' are coupled together by links H² so that upon the movement of the rear shaft F³ both sets of disks and shoes will be depressed and elevated as the case may be. By this arrangement a perfect uniformity of positioning the disks is acquired, and so from the rear of the machine.

If desired the machine may be equipped with a series of presser rolls I which are coupled with the machine in the manner shown and described in my U. S. Letters Patent No. 951,759, dated Mch. 8, 1910.

It is desirable in this class of machines to have the same as compact as possible so that the machine can be more readily turned when required, and with that in view the rows of disks are brought close together, the space above the forward row of disks being occupied by the ends of the relatively long drag bars of the rear row of disks, and so without interfering with the operative mechanism associated with the forward row of disks.

While I have shown two sets of hoppers, I desire it understood that the invention is not limited in that particular as other modifications can be made. However, it is thought that the two sets of hoppers are advantageous, balancing the machine properly and also providing for the distribution of the seed and the fertilizer to a better advantage and making the machine more adjustable and likewise more useful in many ways. The use of the tongue truck in the machine is advantageous in that it properly supports the forward end of the machine and also serves the purposes for which such a structure is primarily designed.

Having thus described my invention, what is claimed is:—

1. A grain drill having forward and rear sets of furrow openers secured against side or horizontal movements and allowing for vertical swinging movement of the same, the rear set of furrow openers operating vertically from a center of radius of different height than the height of the center of radius of vertical movement of the forward set of furrow openers, and the radius of vertical movement of both the forward and rear sets of furrow openers being centered a substantial distance below the frame, and a tongue truck positioned forward of the front set of furrow openers.

2. In a grain drill, the combination with a frame, a front hopper, a rear hopper, a supporting axle positioned under the rear hopper and carrying wheels on the said axle, a front row of furrow openers, a rear row of furrow openers, both of said rows of furrow openers being connected to the frame in advance of the supporting axle, and a tongue truck positioned forward of the forward set of furrow openers and supporting the forward end of the frame.

In testimony whereof I affix my signature in presence of two witnesses.

WILLIAM FETZER.

Witnesses:
G. A. BROWN,
RUSSELL HAYNES.

Copies of this patent may be obtained for five cents each, by addressing the "Commissioner of Patents, Washington, D. C."